United States Patent [19]

Shimirak et al.

[11] Patent Number: 4,701,574
[45] Date of Patent: Oct. 20, 1987

[54] CABLE SEALING APPARATUS

[75] Inventors: Gerlad L. Shimirak; Thomas Hunter, both of Raleigh, N.C.; Martha F. Story, Norcross, Ga.; W. G. Halstead, Raleigh, N.C.; Paul S. Chan, San Francisco; Christopher J. Swinmurn, Mt. View, both of Calif.

[73] Assignee: Raychem Corp., Menlo Park, Calif.

[21] Appl. No.: 730,697

[22] Filed: May 2, 1985

Related U.S. Application Data

[63] Continuation-in-part of Ser. No. 698,643, Feb. 6, 1985, abandoned.

[51] Int. Cl.$^4$ .............................................. H02G 15/08
[52] U.S. Cl. ................................... 174/93; 174/77 R; 174/91; 174/92
[58] Field of Search ................... 174/91, 92, 93, 77 R, 174/41

[56] References Cited

U.S. PATENT DOCUMENTS

| | | | |
|---|---|---|---|
| 905,347 | 12/1908 | McMeen | 174/41 |
| 1,056,483 | 3/1913 | Adams | 174/92 |
| 3,141,060 | 7/1964 | Norton | 174/92 |
| 3,337,681 | 8/1967 | Smith | 174/93 |
| 3,339,011 | 8/1967 | Ewers, Jr. et al. | 174/93 |
| 3,545,773 | 12/1970 | Smith | 174/92 |
| 3,555,171 | 1/1971 | Larson | 174/77 R |
| 3,692,926 | 9/1972 | Smith | 174/92 |
| 3,753,287 | 8/1973 | Ziemek et al. | 174/21 C X |
| 3,836,694 | 9/1974 | Kapell | 174/93 X |
| 3,846,575 | 11/1974 | Troy | 174/41 |
| 4,070,543 | 1/1978 | Thompson et al. | 174/93 X |
| 4,332,975 | 6/1982 | Dienes | 174/76 |
| 4,421,945 | 12/1983 | Moisson | 174/92 |
| 4,504,699 | 3/1985 | Dones et al. | 174/76 |
| 4,610,738 | 9/1986 | Jervis | 174/92 X |

FOREIGN PATENT DOCUMENTS

| | | | |
|---|---|---|---|
| 1159536 | 12/1963 | Fed. Rep. of Germany | 174/93 |
| 2388432 | 12/1978 | France | 174/93 |
| 913727 | 12/1962 | United Kingdom | 174/93 |
| 1429715 | 3/1976 | United Kingdom | 174/93 |
| 2133026A | 10/1983 | United Kingdom | |

Primary Examiner—Morris H. Nimmo
Attorney, Agent, or Firm—Dennis E. Kovach

[57] ABSTRACT

A cable end seal and a closure which includes the cable end seal provides a barrier for a junction against water, the junction being in a cable. First and second end seals are disposed adjacent opposite sides of the junction and palced in compression around the cable, the end seals having an outer convoluted surface which mate with a variable length convoluted tubing bridging member so as to form an environmental closure for the junction.

42 Claims, 11 Drawing Figures

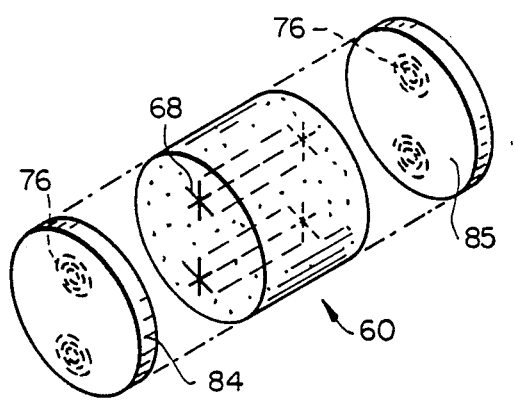
FIG_1
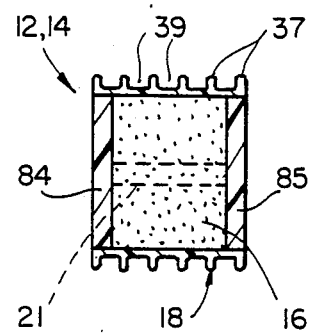
FIG_2
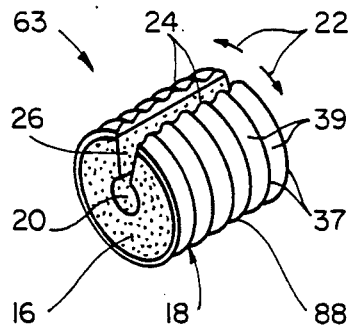
FIG_3
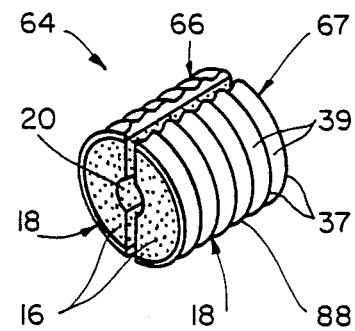
FIG_4
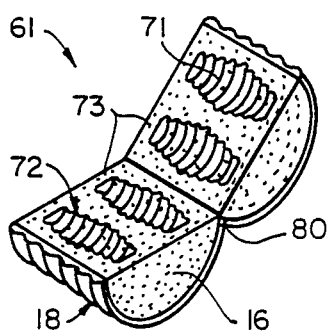
FIG_5
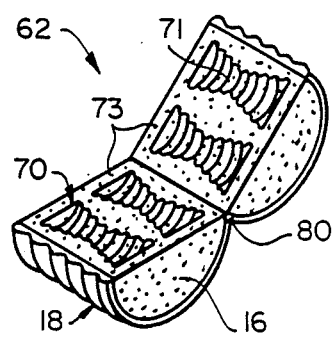
FIG_6

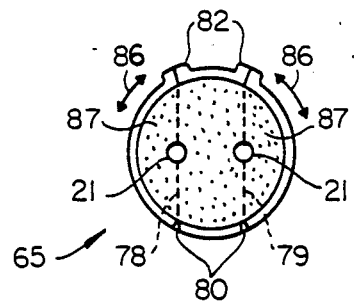
FIG_7
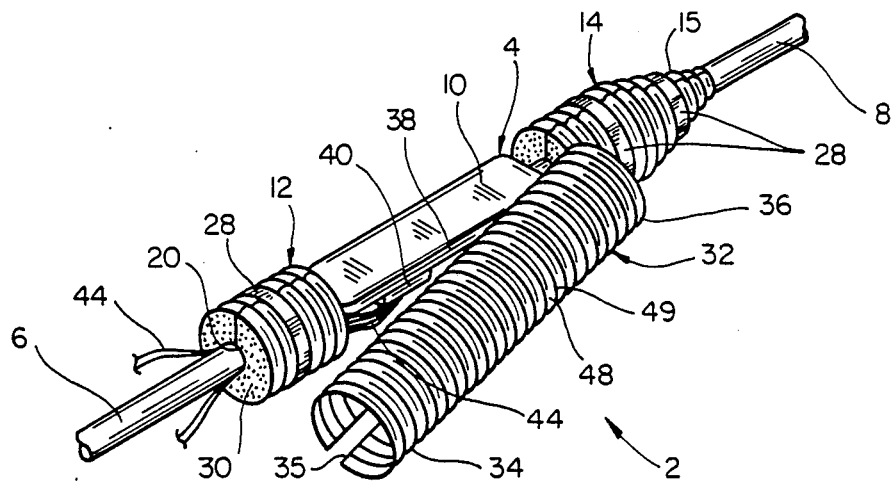
FIG_8
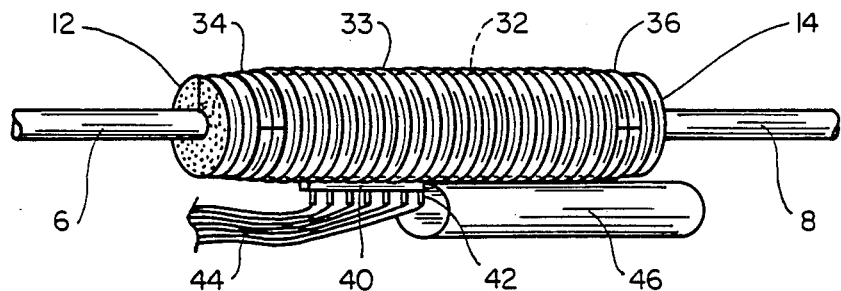
FIG_9

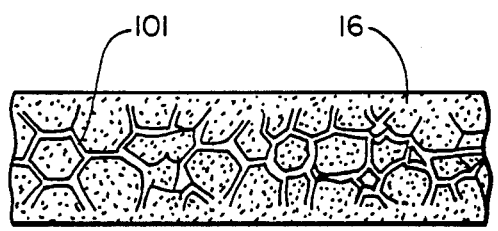
FIG_10A
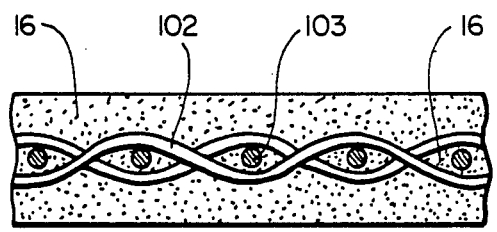
FIG_10B

CABLE SEALING APPARATUS

CROSS REFERENCE TO RELATED APPLICATION

The present invention is a continuation-in-part of U.S. Ser. No. 698,643 filed Feb. 6, 1985, now abandoned, the disclosure of which is incorporated herein by reference.

BACKGROUND OF THE INVENTION

The present invention relates to end seals for sealing cables, and includes closures useable therewith.

Various closures are known in the art for enclosing junctions in cables. The prior art closures suffer from the common drawback that they are relatively complicated in design, complicated to install, and accordingly unduly expensive. In addition, these closures have the further drawback that they are not easily adaptable for accommodating a wide range of junction and cable sizes, and accordingly, a craftsman needs to obtain numerous different closure sizes. In addition, end seals useable with such closures are generally not efficient or effective in keeping water out of the junction being enclosed.

SUMMARY OF THE INVENTION

Accordingly, it is an object of the present invention to eliminate the above-noted drawbacks, and to provide end seals which are effective in keeping water out of a junction in a cable, and accordingly are suitable for use in a cable closure.

Specifically, the end seals of the invention comprise a gel having an open loop network such that it is elastic, conformable, has a cone penetration between 80 and 350 ($10^{-1}$ mm), and an ultimate elongation in excess of 50%, with the gel being contained within a member having a plurality of convolutions therearound, with the end seal further including passage forming means therewithin through which a cable can be inserted. Since the gel creates an excellent moisture barrier against axial water propagation along an outer surface of the cable, and since the convolutions produce an excellent water barrier against water propagating down an outer surface of the end seal, excellent water isolation of a junction for any cable to be sealed results.

According to a preferred embodiment, the gel is disposed in a flexible matrix, the matrix comprising a material having a plurality of open interstices having an average volume of less than 0.01 inches$^3$, the gel including a plurality of interconnective segments which lie within the interstices of the matrix, the matrix and the gel being such that when the gel and the matrix are stretched, the matrix reaches its ultimate elongation before the gel reaches its ultimate elongation. According to another preferred embodiment, a first member is disposed adjacent to and in contact with an outer face of the gel, and the first member can be either a thin layer of plastic or a thin layer of foam.

In a preferred embodiment, as shown for example in FIG. 10A, the flexible matrix comprises a first material that is an organic polymer, in particular an open cell foam having an average cell size of 5 to 30 mils, preferably 10 to 20 mils. In an alternative embodiment of the present invention, as shown for example in FIG. 10B, the matrix is a woven or non-woven fabric, the fibers of the fabric being natural or synthetic and composed of organic or inorganic material, e.g. glass fibers, metal fibers and organic polymer fibers. More particularly, the fabric may be a woven fabric that is 5 to 60 mils thick.

The end seals are especially useable in closures for enclosing junctions along cables, in which case the closure further includes a slit convoluted tube for engagement with first and second end seals disposed on opposite sides of the junction. The convoluted tubing interconnecting the end seals has additional advantages in that it is flexible, it is capable of stretching or contracting due to the convolutions, is relatively crush resistant, and can be cut to any appropriate length in the field due to its uniform construction, and is also further easily installable by simply prying open the tubing in a portion of the slit thereof.

BRIEF DESCRIPTION OF THE DRAWINGS

FIG. 1 illustrates a first preferred embodiment of an end seal of the invention having intersecting slits within a gel portion through which a cable can extend;

FIG. 2 is a side view of another embodiment of an end seal of the invention, FIG. 2 illustrating detailed structure of a convoluted tubing around the gel;

FIGS. 3 and 4 illustrate additional preferred embodiments of the end seal of the invention;

FIGS. 5-7 illustrate further preferred embodiments of end seals useable for branch-off applications; and FIGS. 8 and 9 illustrate additional preferred embodiments of a cable closure for which end seals of the invention are useable.

FIGS. 10A and 10B illustrate two preferred embodiments of a flexible matrix impregnated with a gel useable with the present invention.

In FIG. 10A, the flexible matrix is identified by reference numeral 101, and in FIG. 10B by reference numerals 102, 103, the gel being identified by reference numeral 16 in both figures.

DESCRIPTION OF THE PREFERRED EMBODIMENTS

FIGS. 1-7 illustrate various embodiments of end seals constructed in accordance with the teachings of the present invention, the end seals being particularly adapted for use in constructing closures such as those illustrated in FIGS. 8 and 9.

Preferably, the end seals of FIGS. 1-7 all include a gel which includes an open loop network, preferably a three-dimensional polymeric structure, with the gel having finite elongation properties and being relatively soft. Specifically, it is preferred to use a gel 16 of any of the types described and claimed in copending application Ser. Nos. 434,011 filed Oct. 12, 1982; 504,000 filed June 13, 1983; 507,435 filed June 23, 1983; and 656,555 filed Aug. 31, 1984; all assigned to the assignee of the present invention, the disclosures of which are incorporated herein by reference. In particular, the gel 16 preferably comprises a material having a cone penetration between 80 and 350, preferably between 100 and 350, more preferably between 200 and 300, and most preferably between 240 and 270 ($10^{-1}$ mm); and an ultimate elongation of at least 50%. All cone penetration values cited herein are determined in accordance with American National Standard Designation ASTM D217-68 on an undisturbed sample at 70° F.±5° F. using a standard 1:1 scale cone (cone weight 102.5 g, shaft weight 47.5 g), the penetration being measured after five seconds. Also, ultimate elongations are determined in accordance with the American National Standard Designation ASTM D638-80, at 70°±5° F., using a Type 4 die to cut the sample and at a speed of 50 cm/minute. Preferably, the gel has an ultimate elongation of at least 100%, and more preferably of at least 200%. The gel can comprise either a urethane, silicone, or a non-silicone liquid rubber with low or not unsaturation prior to crosslinking which is then crosslinked, a preferred non-silicone liquid rubber being liquid butyl rubber. Preferably, the gel is formed so as to have a relatively tacky surface, though nontacky gels can be used as well. The gels 16 of the types described, due to their relatively soft nature and elastic properties as well as elongation properties tend to make excellent water barriers when placed under compression since the gels tend to stay intact and do not ooze out and flow as does a grease, especially when subjected to temperature and humidity cycling. Also, preferably an adhesive strength of the gel 16 with a member to which it is secured and contained within, in this case convoluted tubing 18, is greater than a cohesive strength of the gel to itself which results in the gel 16 being secured to the tubing 18.

Various means are illustrated which are formed in the gel to allow passage of a cable therethrough so that an end seal can be formed for the cable when it is passed through the gel. FIGS. 1, 2, 5, 6, 7 illustrate various configurations useful for branch-off situations wherein more than one cable is to be passed through the end seal 12, 14, 60, 61, 62, 65, whereas FIGS. 3 and 4 illustrate embodiments where a single cable is to be passed through the end seal 63, 64 and it can readily be appreciated that the shapes of the passage formed means in the branch-off situations can be incorporated into the non-branch-off situations and vice versa.

In FIG. 1, a plurality of intersecting slits 68 are formed in the gel throughout an axial length thereof, such slits being easily formed using various types of cutting tools, a preferred embodiment being a laser, with a width of the slits being preferably greater than the maximum expected cable diameter to be accommodated. The slits 68 are advantageous in that water or moisture cannot propagate axially therethrough when a cable does not extend through the slits, and even subsequent to removing a cable previously contained within the slits 68.

In the embodiments of FIGS. 2-4 and 7, axial bores 20, 21 are formed in the gel to allow passage of a cable therethrough, preferably a diameter of the bores being smaller than an expected diameter of the cables so as to place the gel in elastic compression subsequent to placing the cable in the bores. In the embodiments of FIGS. 5 and 6, bores 70, 72 are formed only within an interior portion of the gel such that opposite end faces of the gel have sealed surfaces 73. When a cable is to be inserted in bores 70, 72 (FIGS. 5, 6) any appropriate tool such as a knife or pliers can be used to tear away gel portions 73 to allow the cable to be inserted into the bore 70, 72. The bores 70, 72 preferably have conical shapes, with the embodiment of FIG. 5 illustrating a shape wherein a smallest most diameter portion of the bore is adjacent ends of the bore. whereas in the embodiment of FIG. 6 a smallest diameter portion of the bore 70 is located approximately mid-way through the gel. Furthermore, preferably the conical bores 70, 72 further include a series of ridges and valleys similar to those formed on the convoluted tubing 18 identified by reference numerals 37 and 39, the ridges and valleys which are identified generically as ribs 71 forming multiple tight seals around a cable inserted within the bores 70, 72 so as to provide an excellent barrier against axial water propagation therewithin.

In the embodiment of FIG. 3, the end seal 63 comprises a slit elongated member which can be hand-pried open by moving confronting faces 24 in a direction of arrows 22 so that the cables 6 or 8 (FIG. 8) can be inserted into the axial bore 20 through opening 26. In the embodiment of FIG. 4, the end seal comprises two half cyclinders, each having gel therein which again is shaped so as to form an axial bore 20 when assembled, with each half cyclinder being placed around opposite circumferential sides of the cable 6, 8. Tape, tie wraps, or other securing means 28 (FIG. 8) is wrapped around the end seal 63 or 64 to secure in place and compress the gel around the cables 6, 8.

In the embodiments of FIGS. 5-7, hinge members 80 are formed on part of the member 18, in this case convoluted tubing 18, which allows opening and closing of the gel, and FIG. 7 illustrates a clamping means 82 which can be used to secure the convoluted tubing 18 in place subsequent to placing cables within the bores 21, 70, or 72. In FIG. 7, reference numerals 78, 79 illustrate slits formed in the gel which allow movement of portions 87 of the gel along the direction of arrows 86.

According to another preferred embodiment, first and second end members 84, 85 illustrated in FIGS. 1 and 2 are placed on opposite end faces of the gel 16 to environmentally protect the gel. FIG. 1 illustrates one preferred embodiment for inserting cables through the end members 84, 85, this embodiment comprising a plurality of concentrically arranged perforations 76 formed in the end members.

In use, when a cable is to be inserted through the end seal 60 as illustrated in FIG. 1, a concentric circle of perforations 76 slightly larger than the size of the cable to be inserted within the end seal is removed from the members 84, 85 so that the cable can be inserted therethrough, and since the gel is conformable and elastic, the cable can easily be inserted through any of the passage forming means disclosed in the various embodiments, reference numeral 68 illustrating one embodiment in FIG. 1.

As is best illustrated in FIGS. 2, 5 and 6, the convoluted tubing 18 comprises a series of ridges 37 and valleys 39, the embodiment of FIG. 2 illustrating relatively wide valleys 39 and relatively narrow ridges 37, with the embodiments of FIGS. 5 and 6 illustrating more or less sinusoidal shaped valleys and ridges. The valleys and ridges give the tubing 18 a convoluted appearance, the tubing 18 preferably formed out of a soft, durable plastic which can be easily molded into a desired shape. According to the construction of the tubing 18, water or moisture is positively prevented from propagating axially down the end seal along an outer surface 88 (FIGS. 3 and 4) of the end seals since the water is trapped between adjacent ridges and accordingly flows circumferentially around the end seal around the outer surface 88 of the tubing 18 and is removed from the end seal by gravational forces. In addition, since the gel 16 is maintained in compression due to the unique formation of the various embodiments of the passage forming means 20, 21, 68, 70, 72 and by any additional compression means, such as securing means 28, axial water penetration along an outer surface of the cable is also prevented. Hence, it can be appreciated that the end seals of the invention provide an excellent barrier against water, and keep water and moisture from a junction 4 to be enclosed by a closure 2 (FIGS. 8 and 9).

One preferred use of the various type end seals of the invention is illustrated in FIGS. 8 and 9, the end seals being used as part of a closure 2 for surrounding a cable junction 4 between first and second cables 6, 8 which functionally form a single cable, the junction 4 being a splice region, a repair region, a dropwire region, etc. Sections of the cables adjacent opposite ends of the junction 4 are sealed by first and second end seals 12, 14, which can be constructed according to any of the embodiments of FIGS. 1–7.

In the embodiments of FIGS. 8 and 9, a cone-shaped member 15 is disposed adjacent the end seal 14, the cone-shaped member being either formed integrally with seal 14 or separable therefrom, the member 15 being useful when the closure 2 is to be installed in a sustantially vertical orientation with the end seal 14 being at a higher elevation than the end seal 12. The cone-shaped member 15 facilitates removal of water running down an outer surface of a jacket of the cable 8 toward the junction 4.

The closures of FIGS. 8 and 9 further include a crush resistant slit convoluted tube 32 preferably formed from a relatively strong but flexible plastic material. The convoluted tube 32 includes a plurality of ridges and valleys 48, 49 similar in shape, but not necessarily identical in shape, with the ridges and valleys 37, 39 formed on the tubing 18 of the end seals, and are engageable therewith. Though the preferred embodiments illustrated show convolutions throughout the length of the tubing 32, it should be appreciated that such convolutions are only required in a vicinity where the tubing 32 engages with the end seals. However, if the convolutions or ridges and valleys are provided throughout a length of the tubing 32, additional advantages of water blockage are achieved since any water which may get past the end seals would have to further migrate over further ridges and valleys of the tubing 32. Also, the uniform configuration of the tubing 32 gives flexibility in product design since the closure 2 can be supplied to a craftsman in a plurality of parts, the parts including end seals of any of the types illustrated, along with a reel of extended length of tubing 32. Accordingly, when a junction 4 is to be enclosed, the craftsman simply installs the end seals 12, 14 and thereafter simply cuts a predetermined length of tubing to produce a desired specified tailor formed closure.

As indicated, the convolutions of the tubing 18, 32 provide a very effective water blockage means. In addition the convolutions adds strength to the tubing 32 and provide it with additional crush resistance, and further provide it with flexibility in bending which is a significant advantage for closures of an aerial type wherein the closure is oftentimes subjected to severe side loads from wind gusts.

In the embodiments of FIGS. 8 and 9, the convoluted tubing 32 is illustrated as being slit by reference numeral 35, and accordingly easy installation thereof is facilitated since a craftsman simple spreads opposed ends of the tubing 32 apart and slips it over the end seals 12, 14. If an appropriate material is used, the craftsman can simply hand-pry open the flexible tubing 32 and secure it around the junction 4 in the field. In addition, the convolutions allow the tubing to have a variable length since they can easily accommodate contractions and expansions, and accordingly strains within the tubing are more effectively handled when temperature variations cause the cables 6, 8 to expand or contract.

If desired, means can also be included for terminating conductors of the cables 6, 8. In FIG. 8, a termination mounting bar 38, made of an insulating material, is secured to the cables by any appropriate means, such as tape, and a termination 40 having conduction ports 42 is attached thereto. Drop wires 44 are electrically connected to the ports 42, and in the embodiment of FIG. 8, exit the closure via one of the longitudinal bores 20 of the end seals 12, 14. In this embodiment, the tubing 32 has a diameter such that it surrounds the bar 38, termination 40, and ports 42 as well as the junction 4.

FIG. 9 illustrates an alternative embodiment wherein the termination 40 extends beneath the convoluted tube 32 and in this embodiment a shaped, split housing 46 has means such as channels which engage opposite ends of the termination 40 and is capable of sliding along a longitudinal axis of the closure so as to expose the ports 42 and alternatively cover them up to protect them from the environment. The external mounted termination of FIG. 2 allows wires 42 to bypass the end seals 12, 14. Of course, the provision of a termination is optional and is not required with the closure of the invention.

A further optional feature of the invention illustrated in FIG. 9 is the provision of a second convoluted, slit tube 33 disposed concentrically around the first convoluted, split tube 32 which adds further resistance to water ingress into the junction 4. If the slits of the tubes are circumferentially offset, say by 180°, the two tubes 32, 33 render the closure quite suitable for buried cable closure environments, and an inside termination mounting arrangement as illustrated in FIG. 1 could also be included, if this feature were desired.

Though the invention has been described with reference to certain preferred embodiments thereof, it should be appreciated that modifications thereto are readily apparent to those skilled in the art, and those variations are specifically deemed to be a part of the present invention. Accordingly, the invention is to be limited only by the appended claims.

What is claimed is:

1. A cable sealing apparatus, comprising:
   a first end seal, the first end seal comprising:
   a layer of precured gel, the gel being cured prior to contacting a cable to be sealed, the gel being elastic, comformable, having a cone penetration between 80 and 350 ($10^{-1}$ mm), an ultimate elongation in excess of 50%, the layer of gel including means formed therein for passage of the cable to be sealed therethrough between inner and outer opposite faces of the gel, the cable to be sealed being held in contact with the gel formed means;
   a convoluted member forming an outer circumferential surface of the gel, the convoluted member having a series of ridges and valleys extending circumferentially therearound;
   a first member disposed adjacent to and in contact with an outer face of the gel and having means formed therein to facilitate passage of the cable to be sealed therethrough;
   a second member disposed adjacent to and in contact with an inner face of the gel and having means formed therein to facilitate passage of the cable to be sealed therethrough; and
   gel formed means comprising a plurality of longitudinal slits extending through the gel, a width of at least one of the slits being greater than a diameter of the cable to be sealed.

2. The apparatus of claim 1, the gel being disposed in a flexible matrix.

3. The apparatus of claim 2, the flexible matrix comprising a material having a plurality of open interstices having an average volume of less than 0.01 inches$^3$, the gel including a plurality of interconnected segments which lie within the interstices of the matrix.

4. The apparatus of claim 3, the matrix and the gel being such that when the gel and the matrix are stretched, the matrix reaches its ultimate elongation before the gel reaches its ultimate elongation.

5. The apparatus of claim 1, the first member being a thin layer of plastic.

6. The apparatus of claim 1, the first member being a layer of foam.

7. The apparatus of claim 1, the slits intersecting one another.

8. The apparatus of claim 3, the first end seal further comprising means for securing the convoluted member and precured gel around a cable.

9. The apparatus of claim 3, the first end seal being a slit elongated disc.

10. The apparatus of claim 9, the first end seal comprising first and second half-cylinders.

11. The apparatus of claim 3, the gel passage formed means including means for allowing passage of at least first and second cables between the inner and outer opposite faces of the gel.

12. The apparatus of claim 9, the first end seal including means for connecting portions of the disc in a hinged manner to allow opening and closing thereof, and further including means for closing the disc portions.

13. The apparatus of claim 3, further comprising a second end seal, the second end seal comprising:
a second layer of precured gel, the second gel being cured prior to contacting the cable to be sealed, the second gel being elastic, conformable, having a cone penetration between 80 and 350 (10$^{-1}$ mm), and an ultimate elongation in excess of 50%, the second layer of gel including means formed therein for passage of a second cable therethrough between inner and outer opposite faces thereof; and
a second convoluted member disposed around the second gel, the second convoluted member having a series of ridges and valleys extending circumferentially therearound.

14. The apparatus of claim 13, further comprsiing a first bridging member having a convoluted inner surface at opposite ends thereof engageable with the first and second convoluted members of the first and second end seals, respectively.

15. The apparatus of claim 14, the bridging member being slit longitudinally.

16. The apparatus of claim 14, the bridging member having an entire outer and inner surface thereof convoluted and having an inside diameter at the opposite ends thereof which is substantially equal to an outside diameter of the first and second end seals, respectively.

17. The apparatus of claim 14, the first and second end seals and the bridging member forming a closure for a junction in a cable, the first and second end seals being dispsed around the cable adjacent opposite sides of the junction with the bridging member being disposed around the junction and around at least part of each of the first and second end seals.

18. The apparatus of claim 17, further comprising a second bridging member disposed around the first bridging member, the second bridging member being convoluted at opposite ends thereof.

19. The apparatus of claim 17, the gel having a cone penetration between 100 and 270 (10$^{-1}$ mm) and an ultimate elongation of at least 100%.

20. The apparatus of claim 19, the gel having a cone penetration between 200 and 270 (10$^{-1}$ mm).

21. The closure of claim 20, the gel having a cone penetration between 240 and 270 (10$^{-1}$ mm).

22. The closure of claim 20, the gel comprising a non-silicone, liquid rubber with little to no unsaturation which has been crosslinked, the gel comprising a liquid butyl rubber.

23. The apparatus of claim 14, further comprising means for mounting a termination adjacent a junction surrounded by the closure.

24. The apparatus of claim 23, the termination mounting means including means for mounting the termination inside the bridging member after installation.

25. The apparatus of claim 23, the termination mounting means including means for mounting the termination outside the bridging member after installation.

26. The apparatus of claim 14, further comprising means for forming a cone-like shaped member adjacent at least one of the end seals.

27. A splice cable closure, comprising:
first and second ends seals, each end seal comprising a convoluted disc having convolutions on an outer cylindrical surface thereof and having a layer of gel on an inside surface thereof shaped so as to form an axial bore therethrough; and
a bridging member having a continuous convoluted inner surface at opposite ends thereof adapted for engagement with an outer surface of the first and second end seals, the end seals being disposed on a cable opposite a cable splice, the bridging member being disposed around the splice.

28. The closure of claim 27, the bridging member being split longitudinally.

29. The closure of claim 28, one of the end seals being a split, elongated disc.

30. The closure of claim 28, one of the ends seals comprising first and second half-cylinders.

31. The closure of claim 27, the bridging member having an entire outer and inner surface thereof convoluted and having an inside diameter at the opposite ends thereof which is substantially equal to an outside diameter of the first and second end seals, respectively.

32. The closure of claim 31, the bridging member having a tube-like shape.

33. The closure of claim 27, the first and second end seals and bridging member forming a closure for a junction in an electric cable, the first and second end seals being disposed around the cable adjacent opposite sides of the junction with the bridging member being disposed around the junction and around at least part of each of the first and second end seals.

34. The closure of claim 33, further comprising a second bridging member disposed around the first bridging member, the second bridging member being convoluted at opposite ends thereof.

35. The closure of claim 33, further comprising means for urging the gel of the first and second end seals into contact with the cable at the opposite sides of the junction.

36. The closure of claim 33, the gel having a cone penetration between 100 and 350 ($10^{-1}$ mm) and an ultimate elongation of at least 200%.

37. The closure of claim 36, the gel comprising a non-silicon, liquid rubber with little to no unsaturation which has been crosslinked, the gel comprising a liquid butyl rubber.

38. The closure of claim 27, further comprising means for mounting a termination adjacent a junction surrounded by the closure.

39. The closure of claim 38, the termination mounting means including means for mounting the termination inside the bridging member after installation.

40. The closure of claim 38, ther termination mounting means including means for mounting the termination outside of the bridging member after installation thereof.

41. The closure of claim 27, further comprising means for forming a cone-like shape adjacent at least one of the end seals.

42. The closure of claim 27, further comprising means for protecting an exposed surface of the gel of at least one of the end seals from the environment.

* * * * *